(12) United States Patent
Ebner et al.

(10) Patent No.: US 11,578,921 B2
(45) Date of Patent: Feb. 14, 2023

(54) CONTINUOUS FURNACE FOR ALUMINUM STRIPS

(71) Applicant: EBNER INDUSTRIEOFENBAU GMBH, Leonding (AT)

(72) Inventors: Robert Ebner, Leonding (AT); Ulrich Pschebezin, Ansfelden (AT); Alexander Pocherdorfer, Walding (AT); Günther Fröhlich, Sonnberg (AT); Manoj Kumar, Linz (AT)

(73) Assignee: Ebner Industrieofenbau GmbH, Leonding (AT)

( * ) Notice: Subject to any disclaimer, the term of this patent is extended or adjusted under 35 U.S.C. 154(b) by 354 days.

(21) Appl. No.: 16/954,498

(22) PCT Filed: Jan. 15, 2019

(86) PCT No.: PCT/EP2019/050956
§ 371 (c)(1),
(2) Date: Jun. 16, 2020

(87) PCT Pub. No.: WO2019/141682
PCT Pub. Date: Jul. 25, 2019

(65) Prior Publication Data
US 2021/0010754 A1    Jan. 14, 2021

(30) Foreign Application Priority Data
Jan. 16, 2018   (DE) .................... 10 2018 100 842.2

(51) Int. Cl.
*F27B 9/02*    (2006.01)
*C22F 1/00*    (2006.01)
*C22F 1/04*    (2006.01)
(52) U.S. Cl.
CPC .............. *F27B 9/028* (2013.01); *C22F 1/002* (2013.01); *C22F 1/04* (2013.01)

(58) Field of Classification Search
CPC .............. F27B 9/028; C22F 1/002; C22F 1/04
See application file for complete search history.

(56) References Cited

U.S. PATENT DOCUMENTS

| 3,135,633 A | 6/1964 | Hornus |
| 4,401,484 A | 8/1983 | Yoshimoto et al. |

(Continued)

FOREIGN PATENT DOCUMENTS

| CN | 101914736 A | 12/2010 |
| DE | 10 2005 045 340 A1 | 4/2006 |

(Continued)

OTHER PUBLICATIONS

International Search of corresponding PCT/EP2019/050956, dated Mar. 27, 2019, with English translation, 7 pages.

(Continued)

*Primary Examiner* — Jessee R Roe
(74) *Attorney, Agent, or Firm* — Lewis Roca Rothgerber Christie LLP

(57) ABSTRACT

The present invention relates to a continuous furnace system for heat treating a metal component, in particular an aluminium strip. The continuous furnace system has a first heating unit, in which the metal component is heatable for solution annealing up to a first temperature in the range of from 350° C. to 700° C., a cooling unit, in which the metal component is coolable from 300° C. to 750° C. down to 70° C. to 250° C., and a second heating unit, in which the metal component is heatable up to from 150° C. to 290° C. The first heating unit, the cooling unit, and the second heating unit both have a common support structure, on which the first heating unit, the cooling unit, and the second heating unit are fixed together. Furthermore, the continuous furnace system has a common conveyor track, which extends through the first heating unit, the cooling unit, and the second heating unit, wherein the conveyor track is config- (Continued)

ured in such a way that the metal component is passable along the conveyor track in the conveying direction through the first heating unit, the cooling unit, and the second heating unit for heat treatment.

15 Claims, 3 Drawing Sheets

(56) References Cited

U.S. PATENT DOCUMENTS

| | | | |
|---|---|---|---|
| 4,808,247 | A | 2/1989 | Komatsubara et al. |
| 5,700,424 | A | 12/1997 | Matsuo et al. |
| 5,728,241 | A | 3/1998 | Gupta et al. |
| 6,406,571 | B1 | 6/2002 | Gupta et al. |
| 2006/0070689 | A1 | 4/2006 | Kropfl |
| 2007/0144630 | A1 | 6/2007 | Anami et al. |
| 2011/0048591 | A1 | 3/2011 | Schnitzlbaumer et al. |
| 2012/0205842 | A1* | 8/2012 | Kobayashi ............... F27D 9/00 266/251 |
| 2014/0110890 | A1 | 4/2014 | Noe |
| 2015/0345002 | A1 | 12/2015 | Blumenau et al. |

FOREIGN PATENT DOCUMENTS

| | | |
|---|---|---|
| DE | 10 2012 101 018 B3 | 3/2013 |
| DE | 10 2012 110 010 A1 | 4/2014 |
| EP | 0 772 697 B1 | 5/2000 |
| EP | 1 146 305 A1 | 10/2001 |
| JP | 51-67212 | 6/1976 |
| JP | 2000-503069 A | 3/2000 |
| WO | WO 96/07768 A1 | 3/1996 |
| WO | WO 97/22724 A1 | 6/1997 |
| WO | WO 00/70115 A1 | 11/2000 |
| WO | WO 2005/064025 A1 | 7/2005 |
| WO | WO 2006/005573 A1 | 1/2006 |
| WO | 2009/135244 A1 | 11/2009 |
| WO | WO 2016/091550 A1 | 6/2016 |

OTHER PUBLICATIONS

International Written Opinion of corresponding PCT/EP2019/050956, dated Mar. 27, 2019, 9 pages.

Office action issued in corresponding Austria Application No. 4B A 9001/2019, dated Mar. 26, 2021, 4 pages.

* cited by examiner

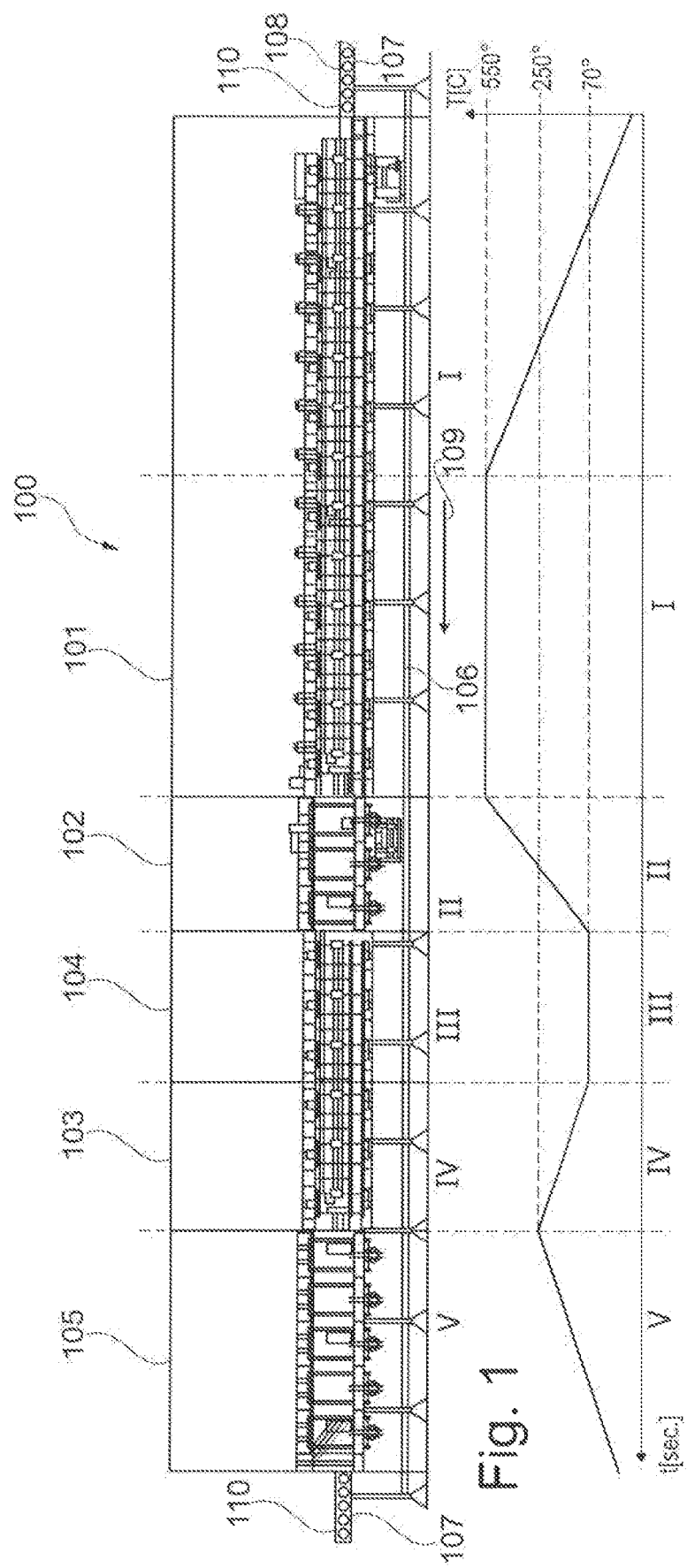

CONTINUOUS FURNACE FOR ALUMINUM STRIPS

REFERENCE TO RELATED APPLICATIONS

The present application is a national phase application derived from the international patent application no. PCT/EP2019/050956, filed Jan. 15, 2019, which in turn claims the benefits of the filing dates of the German patent application no. DE 10 2018 100 842.2, filed Jan. 16, 2018, all of which are incorporated herein by reference in their entireties.

TECHNICAL FIELD

The present invention relates to a continuous furnace system for the heat treatment of a metal component, in particular an aluminium strip, as well as a process for heat treating a metal component with the continuous furnace system.

BACKGROUND OF THE INVENTION

In many industrial sectors, such as for example the automotive industry, it is a concern to use lighter components without having to dispense with sufficient stability. For this reason, lighter materials, such as aluminium or magnesium alloys, are used, because these have a high specific strength and rigidity.

In order to use these advantageous lightweight materials, suitable heat treatment processes must be carried out in order to set the desired (micro)structural properties of the component to be produced. The execution of the heat treatment processes is time-consuming, which limits the efficiency of corresponding heat treatment facilities.

PRESENTATION OF THE INVENTION

There may be a need to provide an efficient heat treatment facility, in which metal components, in particular aluminium strips, can be heat treated efficiently.

This need is satisfied by a continuous furnace system for heat treating a metal component and by a method for heat treating a metal component with the continuous furnace system according to the subject matters of the independent claims.

According to a first aspect of the present invention, a continuous furnace (or through-type furnace) system for heat treating a metal component, in particular an aluminium strip, is described. The continuous furnace system has a first heating unit, in which the metal component is heatable for solution annealing (or solution heat treatment) up to a first temperature in the range of from 350° C. to 700° C., a cooling unit, in which the metal component is coolable from 300° C. or 350° C. to 700° C. or 750° C. down to 70° C. to 250° C. (in particular 50° C. to 150° C.), and a second heating unit, in which the metal component is heatable up to 150° C. to 270° C. or to 290° C. The first heating unit, the cooling unit, and the second heating unit have a common support structure, to which the first heating unit, the cooling unit, and the second heating unit are fixed together. The continuous furnace system further has a common conveyor track, which extends through the first heating unit, the cooling unit, and the second heating unit, wherein the conveyor track is configured in such a way that the metal component is passable along the conveyor track in the conveying direction through the first heating unit, the cooling unit, and the second heating unit for heat treatment.

According to a further aspect of the present invention, a method for heat treating a metal component, in particular an aluminium strip (or band), by the continuous furnace (or through-tape furnace) system described above is described. According to the process, the metal component is heated up for solution annealing (or solution heat treatment) to a first temperature in the range of from 300° C. or 350° C. to 700° C. or 750° C. in the first heating unit. Then, the metal component is cooled from 300° C. or 350° C. to 700° C. or 750° C. down to 70° C. to 250° C. (in particular 50° C. to 150° C.) in the cooling unit. Then, the metal component is heated up to 150° C. to 270° C. or 290° C. in the second heating unit. The metal component is passed in the conveying direction through the first heating unit, the cooling unit, and the second heating unit for heat treatment along the conveyor track.

The continuous furnace system (or through-type furnace system) may in particular be a continuous heat treatment facility, in which the metal component may be guided along a conveying direction continuously or sequentially through the heat treatment stages. Herein, the metal component may be conveyed in contact, for example along rollers, or it may be conveyed in a floating state contactlessly.

The continuous furnace system may in particular be suitable for heat treating a metal component. The metal component may in particular be an aluminium component. In particular, the continuous furnace system may be configured to continuously convey an aluminum strip (or aluminium band) through the continuous furnace system and to temperature-control (or to temper) it. The aluminium strip in particular be a cold-rolled aluminium strip, which may consist of various aluminium alloys of the series 1xxx, 2xxx, 3xxx, 4xxx and 5xxx, 6xxx, 7xxx and 8xxx. The metal component and/or the aluminium strip may have a thickness between 0.8-4 mm.

The cold rolled aluminium strip may be first annealed or solution annealed in the first heating unit in order to achieve the required metallurgical conditions. The aluminium strip may be transferred in a coil from a cold rolling mill to the first heating unit, for example a continuous annealing and solution annealing furnace.

The heating of the aluminium strip may be effected in the first heating unit, for example by blowing hot air through plural nozzle boxes onto the aluminium strip in the vertical direction from above and below. The hot air may be blown, for example, by radial fans, which may provide for a forced convection heat transfer, thus enabling a rapid homogeneous heating of the aluminium strip. The speed of the fans may regulate the heat transfer, for example by adjusting the rotational speed of frequency-controlled fans (or circulating air fans).

The annealing heat treatment of the metal component, in particular of the aluminium strip, may lead to a recovery and recrystallisation of the cold-rolled condition with a resulting fine-grained microstructure in the metal component. During the solution heat treatment, in addition to annealing, also the main stability phase may be dissolved and the metal component may be enriched with dissolved substances. The above conditions may be desired in order to achieve the required mechanical properties in the metal component at the end of the heat treatment line. The temperature for tempering and solution annealing may usually be in the range of from 350° C. to 570° C.

The cooling unit may be arranged immediately after the first heating unit so that the metal component may be coolable from the corresponding exit temperature from the first heating unit in the range of from 350° C. to 700° C. down to 70° C. to 250° C. (in particular 50° C. to 150° C.). Nozzle systems may also be arranged in the cooling unit, through which nozzle systems a cooling fluid, such as for example air or water and/or an air/water mixture, may flow onto the metal component. Cooling air blowers may be provided in the cooling unit, which may provide a defined air flow rate in order to dry the strip after the first heating unit. By the cooling of the metal component in the cooling unit, the solution annealing state of the metal strip may be frozen. During cooling, attention may have to be paid to the thermal quenching stress in the metal component, because for too high a quenching stress a distortion of the metal strip may be caused.

For this reason, the cooling unit may have, for example, air nozzles or air/water nozzles in order to carry out a moderate and precisely adjustable cooling of the metal strip.

Furthermore, the cooling unit may have, for example, blowers in order to suck the humid air out of the cooling zone. The cooling air for the cooling unit may be precisely pre-temperature-controlled so as to be independent of the ambient temperature. Air, water flow and water pressure for the supply of the cooling nozzles may be automatically adjusted by selecting a suitable cooling program for the metal strip to be processed.

During the intelligent quenching of the heat treatable metal component and/or aluminium strip by the cooling unit, for example below 80° C., the frozen state may consist of a super-saturated solution of dissolved elements (for example Mg, Si and Cu) and quenched vacancies (or holes, or voids).

According to the present invention, the strength of the metal component, in particular the aluminium strip, may be further increased by providing, after the cooling unit, for an anew heating (or reheating) in the second heating unit. In doing so, the metal component may be subjected to a heat treatment between 70° C. and 270° C., in particular between 150° C. and 270° C., after the cooling in the first cooling unit. Due to a short duration of the heat treatment in the second heating unit of, for example, 15 seconds to 30 seconds, the temperature-time profile may look like a peak. Therefore it is referred to as "spiking" heat treatment. The spiking may involve the heating of the strip to a desired temperature with and without holding time.

The application of spiking in the second heating unit after the cooling in the cooling unit (so-called quenching) may produce a more favourable distribution of alloying components, such as stable Si/Mg clusters. These stable clusters may become nuclei for the formation of a main hardening phase (β") during the burning in for example of paint in a further heating step, which may lead to a further increase in strength.

According to the present invention, the functional units, such as the first heating unit, the cooling unit and the second heating unit, may be attached to a common support structure. The support structure may consist, for example, of supporting beams and has, for example, a protective frame structure. Thus, for the first time, an integral and compact continuous furnace system, in particular for spiking applications for aluminium strip, may be provided. The individual optional units therefore may not have self-sufficient and independent support structures, but may be jointly and integrally attached to the common support structure. In addition, for example, the functional units, such as the first heating unit, the cooling unit and the second heating unit, may be integrated into a common furnace housing.

Accordingly, it may also be possible to provide a common conveyor track, which may be formed continuously from the entry to (or inlet in) the continuous furnace system to an end (or outlet) of the continuous furnace system. In other words, no transitions or interruptions of the conveyor track may be provided in the interior of the continuous furnace system. Thus, an efficient continuous furnace system may be provided, in which metal components, in particular an aluminium strip, may be heat treated efficiently.

According to an exemplary embodiment of the present invention, the conveyor belt may have rollers at least in one section, along which rollers the metal component may be movable in the conveying direction. Thus, the metal component may be conveyed through the continuous furnace system with contact. The rollers may, for example, be partially driven, so that the rollers may drive the metal component along the conveying direction.

According to a further exemplary embodiment, the conveyor track may have floatation nozzles (or supporting nozzles) at least in one section, wherein the floating nozzles may be configured to flow a fluid, in particular air, against an underside of the metal component, so that the metal component may be conveyable floatingly (or in a floating state) in the conveying direction through the section. The continuous furnace system may thus be referred to as a continuous flotation furnace.

At its entrance, the continuous furnace system may have a deflection roller, which may guide the aluminium strip as a metal component straight, i.e. parallel to the conveying direction, into the furnace. In a preferred embodiment, the metal component may be guided through the continuous furnace system completely contactlessly and heat treated accordingly.

In addition to the floatation nozzle field, which in particular may flow on a lower surface of the metal component and accordingly may generate a floating field below the metal component, nozzles may be arranged also above the metal component, which nozzles may flow a corresponding temperature-control fluid, such as temperature-controlled air, water or an air/water mixture, onto an upper surface of the metal component. With the appropriate application of the temperature control fluid, a pressure may be effected on the upper surface of the metal component so that a sinusoidal or cross-arc shaped floating cushion may be generated. This may result in a sinusoidal wave pattern of the metal component and may stabilize the passage of the metal component through the continuous furnace system.

According to a further exemplary embodiment, the first heating unit may have a length of from 40 m to 90 m along the conveying direction, in particular 50 m to 65 m. It has been found that with a conveying speed of 60 m/min and 90 m/min for the length of the first heating unit described above, the metal component may be on hand in a preferred dissolved or solution-annealed (micro)structural state.

Furthermore, the first heating unit may have a length of om 20 m to 90 m or from 40 m to 120 m along the conveying direction.

According to a further exemplary embodiment, the cooling unit may have a length of from 5 m to 35 m, in particular 12 m to 18 m, along the conveying direction. It has been found that with a conveying speed of 60 m/min and 90 m/min for the length of the cooling unit described above, the metal component may be frozen in a preferred solution annealing state without reaching a critical thermal quenching stress in the metal component.

Furthermore, the cooling unit may have a length of from 1 m to 35 m or from 5 m to 50 m along the conveying direction.

According to a further exemplary embodiment, the second heating unit may have a length of from 5 m to 25 m along the conveying direction, in particular a length of from 10 m to 18 m, further in particular 12 m to 15 m. It has been found that with a conveying speed of 60 m/min and 90 m/min for the length of the second heating unit described above, a more favourable distribution of alloying components, for example stable Si/Mg clusters, may be produced.

Furthermore, the second heating unit may have a length of from 1 m or 2 m to 25 m, or from 5 m to 50 m along the conveying direction.

According to a further exemplary embodiment, as already explained, the first heating unit may be configured to heat the metal component by means of fuel gas, contact heating, induction heating, convection heating, eddy current heating, electric heating coil, infrared heating or radiant heating.

According to a further exemplary embodiment, as already explained, the second heating unit may be configured to heat the metal component by fuel gas, by a contact heating, by an induction heating, by a convection heating, by an eddy current heating, by an electrical heating register, by an infrared heating, or by a heat radiation heating.

According to a further exemplary embodiment, the cooling unit, as already explained, may have nozzles for a cooling medium, in particular air, water or an air/water mixture, for cooling the metal component.

According to a further exemplary embodiment, the continuous furnace system further may have a holding unit for holding (or maintaining) a temperature of from 70° C. to 150° C. of the metal component. The holding unit may be arranged between the cooling unit and the second heating unit, wherein the holding unit may be coupled to the support structure, and wherein the conveyor track may extend through the holding unit.

Between the cooling unit and the anew reheating in the second heating unit, the metal component may be conveyed through the holding unit and may be kept at a constant temperature as described above. During this time, e.g. 15 seconds to 3 minutes, the dissolved substances (or solutes) and vacancies (or holes, or voids) in the metal component may begin to group and to develop into nuclei. There may be two types of nuclei. One type of nuclei may dissolve, and the second type may grow during the next heat treatments in the second heating unit. During the reheating, a considerable amount of stable nuclei may thus grow and thus may ensure a high strength of the metal component.

According to a further exemplary embodiment, the holding unit may have a length of from 10 m to 18 m along the conveying direction, in particular 12 m to 15 m. Thus, a correspondingly above described retention period of the metal component with a constant temperature may be achieved in order to form the corresponding nuclei in the material of the metal component.

According to a further exemplary embodiment, the continuous furnace system may have a further cooling unit, in which the metal component may be coolable from 150° C. to 270° C. down to 70° C. to 150° C. The further cooling unit may be arranged after the second heating unit in the conveying direction, wherein the further cooling unit may be coupled to the support structure, and wherein the conveyor track may extend through the further cooling unit. After the further cooling unit, the metal component may be further processed or, if necessary, may be supplied to further heat treatment steps. For example, paint or a further alloy may be burned in into the metal component in a further heat treatment step.

According to a further exemplary embodiment, the further cooling unit may have a length of from 18 m to 22 m, in particular 20 m, along the conveying direction.

According to a further exemplary embodiment, the conveyor track may be configured in such a way that a conveying speed of the conveyor track may be adjustable between 60 m/min and 90 m/min, in particular between 70 m/min and 80 m/min. The conveyor speed may be variably adjusted, for example, by means of a control unit, so that different heat treatment profiles may be set along the continuous furnace system for the metal component.

It should be noted that the embodiments, which are described herein, represent only a limited selection of possible embodiment variants of the invention. Thus, it is possible to combine the features of individual embodiments in a suitable manner, so that for the skilled person with the here explicit embodiments, a plurality of different embodiments is to be considered as obviously disclosed. In particular, some embodiments of the invention are described by device claims and other embodiments of the invention by process claims. However, it will immediately become clear to the person skilled in the art upon reading this application that, unless explicitly stated otherwise, in addition to a combination of features, which belong to one type of subject-matter of the invention, also an arbitrary combination of features, which belongs to different types of subject-matter of the invention, is also possible.

BRIEF DESCRIPTION OF THE DRAWINGS

For a further explanation and a better understanding of the present invention, embodiment examples are described in the following in more detail with reference to the appended drawings, in which:

FIG. 1 shows a schematic illustration of a continuous furnace system according to an exemplary embodiment of the present invention.

FIG. 2 shows a time/temperature diagram, in which the temperature curves of a metal component within the continuous furnace system from FIG. 1 are reproduced.

DETAILED DESCRIPTION OF EXEMPLARY EMBODIMENTS

Figure 3:
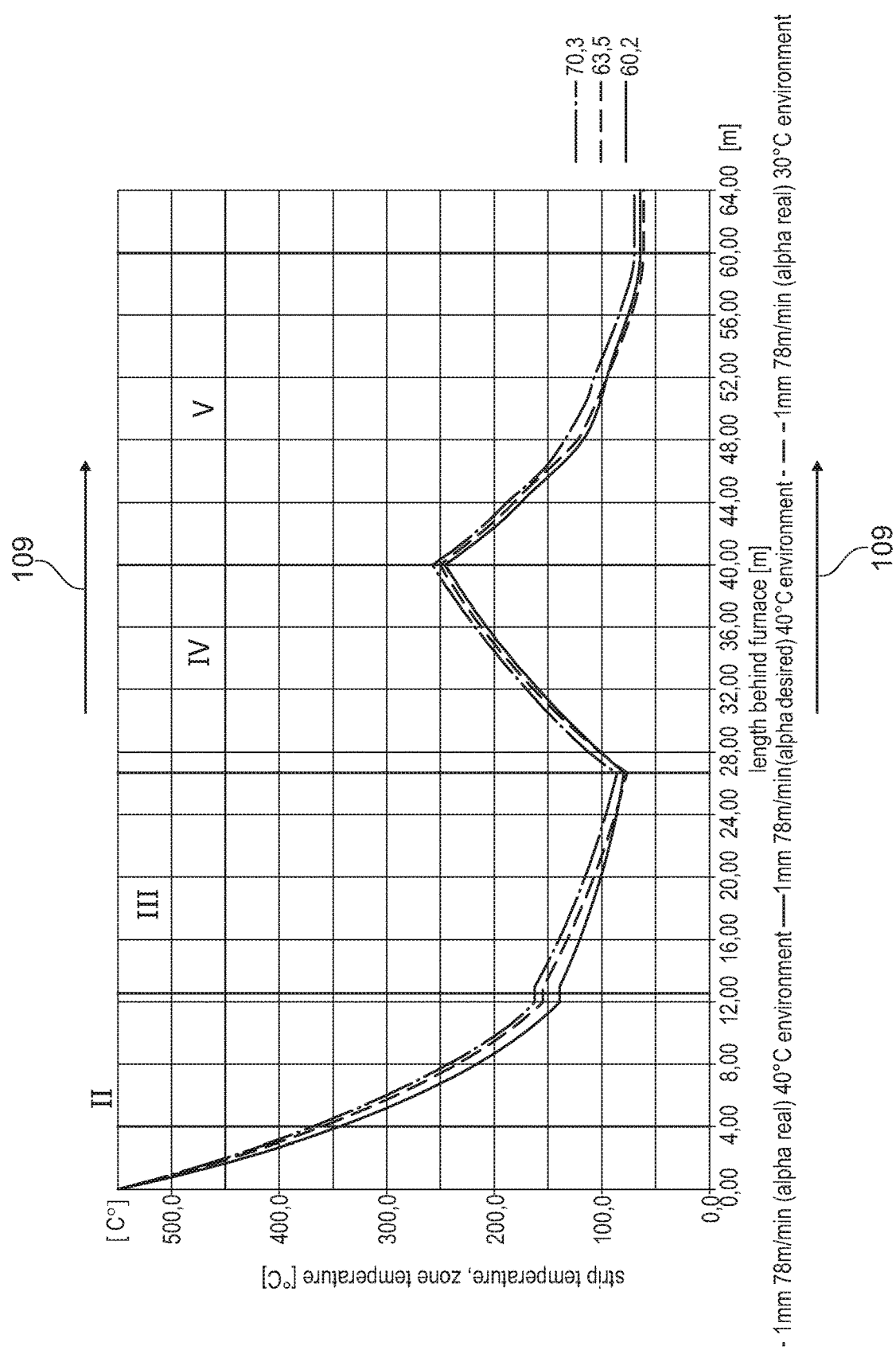
FIG. 3 shows a path/temperature diagram in which the temperature curves of a metal component along a distance within the continuous furnace system from FIG. 1 are reproduced.

Same or similar components in different figures are provided with the same reference numerals. The representations in the figures are schematic.

FIG. 1 shows a continuous furnace system 100 for heat treating a metal component 110, in particular an aluminium strip. FIG. 2 shows a time/temperature diagram, in which the temperature curves of a metal component within the continuous furnace system from FIG. 1 are reproduced. The continuous furnace system 100 may have a first heating unit 101, in which the metal component 110 may be heatable for solution annealing up to a first temperature in the range of from 350° C. to 700° C., a cooling unit 102, in which the metal component 110 may be coolable from 350° C. to 700° C. down to 70° C. to 250° C., and a second heating unit 103, in which the metal component 110 may be heatable up to 150° C. to 270° C. The first heating unit 101, the cooling unit 102 and the second heating unit 103 may have a common support structure 106, on which the first heating unit 101, the cooling unit 102 and the second heating unit 103 may be fixed together (or jointly). Furthermore, the continuous furnace system 100 may have a common conveyor track 107, which may extend through the first heating unit 101, the cooling unit 102, and the second heating unit 103, wherein the conveyor track 107 may be designed in such a way that the metal component 110 may be passable along the conveyor track 107 in the conveying direction 109 through the first heating unit 101, the cooling unit 102, and the second heating unit 103 for heat treatment.

The continuous furnace system 100 may be a continuous heat treatment system, in which the metal component 110 may be guided along a conveying direction 109 continuously or sequentially through the heat treatment stages. Herein, the metal component 110 may be conveyed with contact, for example along rollers 108, or it may be conveyed in a floating state contactlessly (or without contact).

The metal component 110 may in particular be an aluminum strip, which may be conveyed continuously through the continuous furnace system 100.

The cold-rolled aluminum strip 110 may first be solution annealed in a heating zone I in the first heating unit 101 in order to achieve the required metallurgical conditions. The aluminium strip 110 may be transferred in a coil from a cold rolling mill to the first heating unit 101, for example a continuous annealing and solution heat treatment furnace.

The heating of the aluminum strip 110 in the first heating unit 101 may be effected, for example, by blowing hot air through plural nozzle boxes onto the aluminum strip 110 in a vertical direction from above and below.

The annealing heat treatment of the aluminium strip 110, may result in a recovery and recrystallization of the cold-rolled state with the resulting fine-grained microstructure in the metal component 110. During the solution heat treatment, in addition to annealing, also the main stability phase may be dissolved and the metal component 110 may be enriched with dissolved substances.

The cooling unit 102 may be located in the cooling zone II, and may be arranged immediately after the first heating unit 101, so that the aluminium strip may be coolable from the corresponding exit temperature from the first heating unit 101 in the range of from 350° C. to 700° C. down to 70° C. to 250° C. In the exemplary temperature curve as shown in FIG. 2, the aluminium strip 110 may first be heated up to 550° C. in heating zone I and may then cooled down to 70° C. in cooling zone II.

In the cooling unit 102, nozzle systems may also be arranged, through which a cooling fluid, such as for example air or water and/or an air/water mixture, may flow onto the aluminium strip 110.

The strength of the aluminium strip 110 may be increased further by performing an anew reheating after the cooling unit 102 in the heating zone IV, within which the second heating unit 103 may be provided. In this process, the metal component may, after the cooling in the first cooling unit 102 and, for example, after a certain holding time in the holding zone III, be subjected to a heat treatment, until the aluminium strip 110 again may have a temperature of approximately 52° C. Due to a short duration of the heat treatment in the second heating unit 103 of, for example, 15 seconds to 30 seconds, the temperature-time profile may look like a spike (or peak). This is why it is called "spiking" heat treatment.

The continuous furnace system 100 may further have a holding unit 104 in the holding zone III for holding (or maintaining) a temperature of 70° C. to 150° C. of the aluminium strip 110. The holding unit 104 may be arranged between the cooling unit 102 and the second heating unit 103, wherein the holding unit 104 may be coupled to the support structure 106, and wherein the conveyor track 107 may extend through the holding unit 104.

During this holding time of, for example, 15 seconds to 3 minutes at a constant exit temperature, the dissolved substances (or solutes) and the vacancies (or holes, or voids) in the aluminium strip may begin to group and to develop into nuclei.

Furthermore, the continuous furnace system 100 may have, in the further cooling zone V, a further cooling unit 105, in which the metal component may be coolable from 150° C. to 270° C. down to 70° C. to 150° C. The further cooling unit 105 may be arranged in the conveying direction 109 after the second heating unit 103, wherein the further cooling unit 105 may be coupled to the support structure 106, and wherein the conveyor track 107 may extend through the further cooling unit 105. After the further cooling unit 105, the aluminium strip 110 may be further processed or, if necessary, supplied to further heat treatment steps, such as for example the further holding zone VI and the further heating zone VII (see FIGS. 4 and 5).

The first heating unit 101, the cooling unit 102, the holding unit 104, the second heating unit 103 as well as the further cooling unit 105 may be attached to a common support structure 106. The support structure 106 may consist for example of support beams, and may have for example a protective frame structure.

The conveyor 107 may run continuously from the entry to (or inlet in) the continuous furnace system 100 to an end of the continuous furnace system 100. The conveyor track 107 may have rollers 108 at least in one section, along which the aluminium strip 110 may be movable in the conveying direction. In addition or alternatively, the conveyor track 107 may have floating nozzles at least in one section, wherein the floating nozzles may be arranged to flow a fluid, in particular air, against an underside of the aluminium strip 110 so that the aluminium strip 110 may be conveyable through the section in a floating manner in the conveying direction 109.

FIG. 3 shows a path/temperature diagram, in which the temperature curves of a metal component 110 along a distance within the continuous furnace system 100 from FIG. 1 are shown. In the diagram shown in FIG. 3, the distance from the exit (or outlet) of the first heating unit 101 is shown, as well as the corresponding associated temperature curves. In the diagram shown, temperature curves are shown of aluminium strips 110, and which may have a thickness of 1 mm, which may pass through the continuous furnace system 100 along the conveying direction 109 at a speed of 78 m/min.

The first heating unit 101, which is not shown in FIG. 3, may have a length of from 50 m to 65 m along the conveying direction 109. At the end of the first heating zone I, the aluminium strip thus may have a temperature of approx. 550° C.

In the second cooling zone II, the aluminium strip 110 may be cooled from 550° C. down to 150° C. by the cooling unit 102. The cooling unit 102 may have a length of 12 m along the conveying direction 109.

In holding zone III, the temperature of the aluminum strip 110 may be held approximately constant by the holding unit 104, wherein though a moderate cooling from 150° C. to 80° C. may take place. The holding unit 104 may have a length of approx. 14 m along the conveying direction 109.

In heating zone IV, the temperature of the aluminium strip 110 may be heated by the second heating unit 103 up to from 80° C. to 250° C. The second heating unit 103 may have a length of approx. 13 m along the conveying direction 109.

In the further cooling zone V, the temperature of the aluminum strip 110 may be cooled from 250° C. down to approx. 60° C. by the further cooling unit 105. The further cooling unit 105 may have a length of approx. 20 m along the conveying direction 109.

Figure 4:
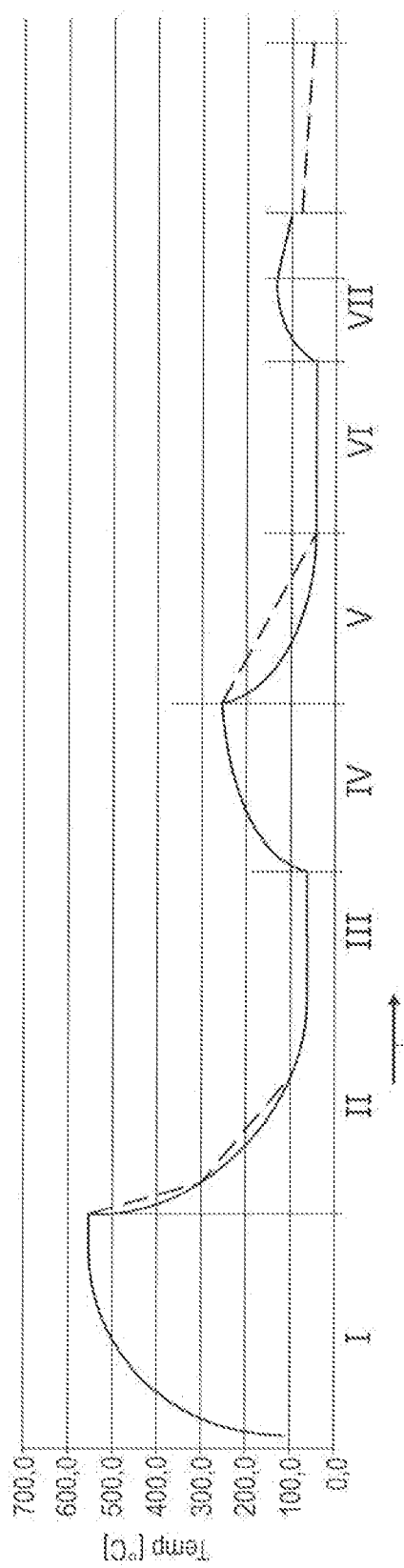
FIG. 4 and FIG. 5 show schematic path/temperature diagrams, in which exemplary temperature curves of a metal component during the passing through a continuous furnace system according to an exemplary embodiment of the present invention are reproduced.
Figure 5:
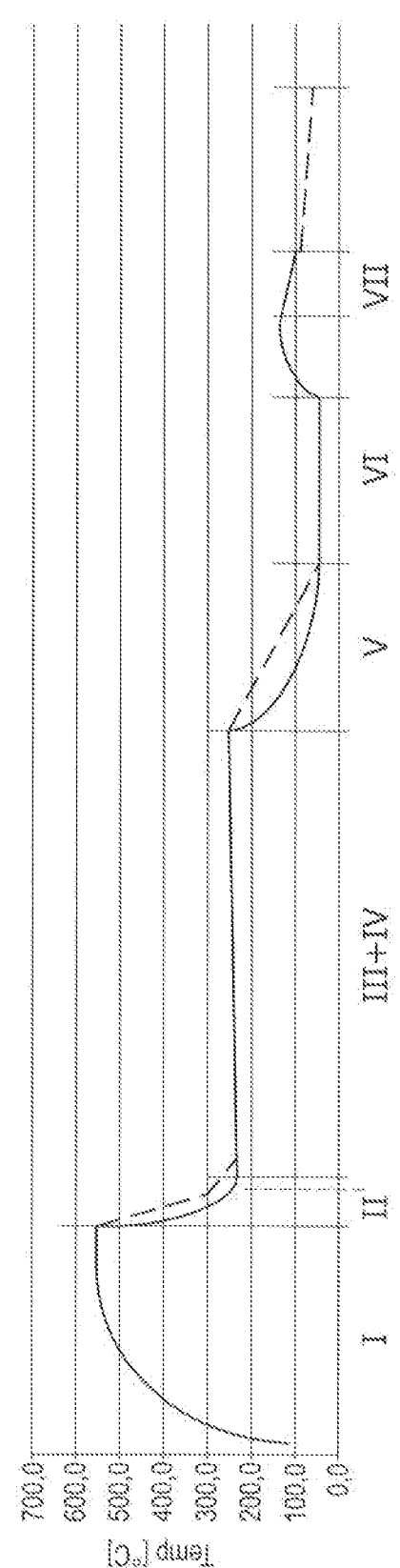

FIG. 4 and FIG. 5 show schematic path/temperature diagrams, in which exemplary temperature curves of a metal component 110 during the passing through a continuous furnace system 100 according to an exemplary embodiment of the present invention are reproduced.

In the path-temperature diagram in FIG. 4, a temperature curve is shown of a aluminium strip, which may be 1.2 mm thick, and which may pass through a continuous furnace system 100 according to the invention at a speed of 60 m/min.

In the first heating zone I, the first heating unit 101 may be provided, which may heat the aluminium strip 110 up to approx. 550° C. and may maintain this temperature for approx. 10 seconds.

Subsequently, the cooling zone II may begin, wherein in a first step, the temperature of the aluminum strip 110 may be adjusted from 550° C. to 300° C. and in a second step, the temperature may be adjusted from 300° C. to less than 80° C. at the exit of cooling zone II. For example, with a strip thickness of from 0.5 mm to 1.2 mm, a cooling rate of more than 50° C. per second may be achieved, and with a material thickness of the strip of from 1.3 mm to 4.2 mm, a cooling rate of more than 30° C. per second may be achieved.

In the holding zone III, the temperature of the aluminium strip 110 may be held at approx. 80° C.

In heating zone IV, the temperature of the aluminum strip 110 may be set to approximately 250° C. by the second heating unit 103.

Subsequently, in the further cooling zone V, the temperature of the aluminum strip 110 may be cooled from 250° C. down to 60° C. Herein, for example, a cooling rate of more than 5° C. per second may be applied.

After the cooling the aluminum strip 110 in the further cooling zone V, the aluminum strip may be held at the exit temperature of 60° C. for approximately 15 minutes in a further holding zone VI.

Subsequently, further processing steps may be carried out. For example, in a further heating zone VII the temperature may be adjusted between 50° C. and 100° C., and a rolling process of the aluminium strip 110 may be carried out. In a further heat treatment step, for example, paint and/or another alloy may be burned in into the aluminium strip 110.

In the path/temperature diagram in FIG. 5, a temperature curve is shown of an aluminum strip, which may be 1.2 mm thick, and which may pass through a continuous furnace system 100 according to the invention at a speed of 60 m/min.

In the first heating zone I, the first heating unit 101 may be provided, which may heat the aluminium strip 110 up to approx. 550° C. and may maintain this temperature for approx. 10 seconds.

Subsequently, the cooling zone II may begin, wherein in a first step, the temperature of the aluminum strip 110 may be adjusted from 550° C. to 300° C. and in a second step, the temperature may be adjusted from 300° C. to approx. 220° C. at the exit of the cooling zone II. For example, with a strip thickness of from 0.5 mm to 1.2 mm, a cooling rate of more than 50° C. per second may be achieved, and with a material thickness of from 1.3 mm to 4.2 mm, a cooling rate of more than 30° C. per second may be achieved.

The holding zone III and the heating zone IV may hold the aluminium strip 110 almost at a constant temperature and/or increase the temperature of the aluminium strip 110 moderately to approx. 250° C. at the exit of heating zone IV.

Subsequently, in the further cooling zone V, the temperature of the aluminium strip 110 may be cooled from 250° C. down to 60° C. Herein, for example, a cooling rate of more than 5° C. per second may be applied.

After the cooling the aluminum strip 110 in the further cooling zone V, the aluminum strip may be held at the exit temperature of 60° C. for about 15 minutes in a further holding zone VI.

Subsequently, further processing steps may be carried out. For example, in a further heating zone VII, the temperature may be adjusted between 50° C. and 100° C., and a rolling process of the aluminium strip 110 may be carried out. For example, in a further heat treatment step, paint or a further alloy may be burned in into the aluminium strip 110.

Supplementarily, it should be noted that "having" does not exclude other elements or steps, and "an" or "a" does not exclude a plurality. Furthermore, it should be noted that features or steps, which have been described with reference to one of the above embodiment examples, can also be used in combination with other features or steps of other embodiment examples described above. Reference numerals in the claims should not be considered as a limitation.

LIST OF REFERENCE NUMERALS

100 continuous furnace system
101 first heating unit
102 cooling unit
103 second heating unit
104 holding unit
105 further cooling unit
106 support structure
107 conveyor track
108 rollers
109 conveying direction
110 metal component
I heating zone
II cooling zone
III holding zone
IV heating zone
V further cooling zone
VI further holding zone
VII further heating zone

The invention claimed is:

1. A continuous furnace system for heat treating a metal component, the continuous furnace system comprising:
   a first heating unit, in which the metal component is heatable for solution annealing up to a first temperature in a range from 300° C. to 750° C.;
   a cooling unit, in which the metal component is coolable from 300° C. to 750° C. down to 70° C. to 250° C.;
   a second heating unit, in which the metal component is heatable up to 150° C. to 290° C.;
   wherein the first heating unit, the cooling unit, and the second heating unit have a common support structure, to which the first heating unit, the cooling unit, and the second heating unit are fixed together; and a common conveyor track, which extends through the first heating unit, the cooling unit, and the second heating unit, wherein the conveyor track is configured in such a way that the metal component is passable through along the conveyor track in the conveying direction through the first heating unit, the cooling unit, and the second heating unit for heat treatment;

wherein the conveyor track has floating nozzles at least in one section, and wherein the floatation nozzles are arranged to flow a fluid or air against an underside of the metal component so that the metal component is conveyable through the section in a floating manner in the conveying direction.

2. The continuous furnace system according to claim 1, wherein the conveyor track has rollers at least in one section, along which the metal component is movable in the conveying direction.

3. The continuous furnace system according to claim 1, wherein the first heating unit has a length along the conveying direction from 20 m to 120 m.

4. The continuous furnace system according to claim 1, wherein the cooling unit has a length along the conveying direction from 1 m to 50 m.

5. The continuous furnace system according to claim 1, wherein the second heating unit has a length along the conveying direction from 1 m to 50 m.

6. The continuous furnace system according to claim 1, wherein the first heating unit is configured to heat the metal component by fuel gas, by a contact heating, by an induction heating, by a convection heating, by an eddy current heating, by an electric heating register, by an infrared heating, or by a heat radiation heating.

7. The continuous furnace system according to claim 1, wherein the second heating unit is configured to heat the metal component by fuel gas, by a contact heating, by an induction heating, by a convection heating, by an eddy current heating, by an electric heating register, by an infrared heating or by a heat radiation heating.

8. The continuous furnace system according to claim 1, wherein the cooling unit has nozzles for a cooling medium for cooling the metal component.

9. The continuous furnace system according to claim 1, further having:
a holding unit for maintaining a temperature from 70° C. to 250° C. of the metal component,
wherein the holding unit is arranged between the cooling unit and the second heating unit,
wherein the holding unit is coupled to the support structure, and
wherein the conveyor track extends through the holding unit.

10. The continuous furnace system according to claim 9, wherein the holding unit has a length from 5 m to 25 m along the conveying direction.

11. The continuous furnace system according to claim 1, further having:
a further cooling unit, in which the metal component is coolable from 150° C. to 270° C. down to 70° C. to 150° C.,
wherein the further cooling unit is arranged in the conveying direction after the second heating unit, wherein the further cooling unit is coupled to the support structure, and wherein the conveyor track extends through the further cooling unit.

12. The continuous furnace system according to claim 11, wherein the further cooling unit has a length along the conveying direction from 18 m to 22 m.

13. The continuous furnace system according to claim 1, wherein the conveyor track is configured in such a way that a conveying speed of the conveyor track is adjustable between 60 m/min and 90 m/min.

14. A continuous furnace system for heat treating a metal component, the continuous furnace system comprising:
a first heating unit, in which the metal component is heatable for solution annealing up to a first temperature in a range from 300° C. to 750° C.;
a cooling unit, in which the metal component is coolable from 300° C. to 750° C. down to 70° C. to 250° C.;
a second heating unit, in which the metal component is heatable up to 150° C. to 290° C.;
wherein the first heating unit, the cooling unit, and the second heating unit have a common support structure, to which the first heating unit, the cooling unit, and the second heating unit are fixed together;
a common conveyor track, which extends through the first heating unit, the cooling unit, and the second heating unit,
wherein the conveyor track is configured in such a way that the metal component is passable through along the conveyor track in the conveying direction through the first heating unit, the cooling unit, and the second heating unit for heat treatment; and
a holding unit for maintaining a temperature from 70° C. to 250° C. of the metal component,
wherein the holding unit is arranged between the cooling unit and the second heating unit,
wherein the holding unit is coupled to the support structure, and
wherein the conveyor track extends through the holding unit.

15. A continuous furnace system for heat treating a metal component, the continuous furnace system comprising:
a first heating unit, in which the metal component is heatable for solution annealing up to a first temperature in a range from 300° C. to 750° C.;
a cooling unit, in which the metal component is coolable from 300° C. to 750° C. down to 70° C. to 250° C.;
a second heating unit, in which the metal component is heatable up to 150° C. to 290° C.;
wherein the first heating unit, the cooling unit, and the second heating unit have a common support structure, to which the first heating unit, the cooling unit, and the second heating unit are fixed together; and
a common conveyor track, which extends through the first heating unit, the cooling unit, and the second heating unit,
wherein the conveyor track is configured in such a way that the metal component is passable through along the conveyor track in the conveying direction through the first heating unit, the cooling unit, and the second heating unit for heat treatment;
wherein the conveyor track is configured in such a way that a conveying speed of the conveyor track is adjustable between 60 m/min and 90 m/min.

* * * * *